United States Patent
Howell et al.

(10) Patent No.: US 12,415,616 B2
(45) Date of Patent: Sep. 16, 2025

(54) MONITORING SYSTEM FOR AN AIRCRAFT

(71) Applicant: Airbus Operations Limited, Bristol (GB)

(72) Inventors: George Howell, Bristol (GB); Andrew Hebborn, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 482 days.

(21) Appl. No.: 17/702,187

(22) Filed: Mar. 23, 2022

(65) Prior Publication Data

US 2022/0363406 A1 Nov. 17, 2022

(30) Foreign Application Priority Data

Mar. 25, 2021 (GB) ..................................... 2104230

(51) Int. Cl.
*B64D 45/00* (2006.01)

(52) U.S. Cl.
CPC ...... *B64D 45/00* (2013.01); *B64D 2045/0085* (2013.01)

(58) Field of Classification Search
None
See application file for complete search history.

(56) References Cited

U.S. PATENT DOCUMENTS

| | | | | |
|---|---|---|---|---|
| 6,722,610 B1 * | 4/2004 | Rawdon | ................ | B64C 25/50 244/103 W |
| 8,463,466 B2 | 6/2013 | Venios et al. | | |
| 10,486,801 B2 * | 11/2019 | Cantinaud | ............... | B64C 13/16 |
| 2003/0125848 A1 * | 7/2003 | Otake | ..................... | B64C 25/48 244/175 |
| 2008/0188998 A1 * | 8/2008 | Venios | ................. | G05D 1/0083 701/3 |
| 2017/0008619 A1 * | 1/2017 | Romana | ............... | G05D 1/0204 |
| 2020/0302809 A1 | 9/2020 | Turcios et al. | | |

FOREIGN PATENT DOCUMENTS

| | | | | |
|---|---|---|---|---|
| EP | 3 118 109 | | 1/2017 | |
| EP | 3118109 A1 * | | 1/2017 | ............ B64C 13/16 |
| EP | 3118109 B1 * | | 11/2019 | ............ B64C 13/16 |

(Continued)

OTHER PUBLICATIONS

Search and Examination Report for GB2104230.4, dated Dec. 23, 2021, 11 pages.

*Primary Examiner* — Shelley Chen
(74) *Attorney, Agent, or Firm* — Nixon & Vanderhye P.C.

(57) ABSTRACT

A monitoring system 300 for an aircraft 100 including a controller 301 to determine, based on one or more conditions, one or more expected operating characteristics of a steering system of the aircraft. The one or more conditions include one or more aircraft conditions indicative of an internal condition of the aircraft and/or one or more external conditions indicative of an external influence on the aircraft. The controller compares the one or more expected operating characteristics with the one or more actual operating characteristics. The controller is configured to determine, based on the compare, whether to issue a signal indicating a condition of the aircraft. An avionics system 3000 comprising the monitoring system, an aircraft comprising the monitoring system or the avionics system, and a method 600 of monitoring an aircraft.

19 Claims, 5 Drawing Sheets

(56) References Cited

FOREIGN PATENT DOCUMENTS

| | | | | |
|---|---|---|---|---|
| FR | 2924831 A1 | * | 6/2009 | ........... G05D 1/0083 |
| KR | 20160079393 A | * | 7/2016 | |
| WO | 2020/006641 | | 1/2020 | |
| WO | WO-2020006641 A1 | * | 1/2020 | ................ B60T 7/22 |

* cited by examiner

MONITORING SYSTEM FOR AN AIRCRAFT

RELATED APPLICATION

This application incorporates by reference and claims priority to United Kingdom Patent Application GB2104230.4, filed Mar. 25, 2021.

TECHNICAL FIELD

The present invention relates to a monitoring system for an aircraft, an avionics system comprising the monitoring system, a method of monitoring an aircraft, a non-transitory computer readable storage medium, and an aircraft assistance device for assisting operation of an aircraft.

BACKGROUND

Modern aircraft typically have landing gear comprising a plurality of undercarriages which support the aircraft when it is on the ground. Some of the undercarriages have braking wheels which are operable to provide a braking force to decelerate the aircraft when a braking torque is applied by a set of brakes. One or more of the undercarriages is steerable and may be rotated to steer the aircraft.

During some ground manoeuvres, the aircraft may experience unintended changes in heading, for example due to external factors such as cross-winds, gusts and variations in a runway surface, as well as aircraft factors such as uneven tyre pressure, asymmetric braking, asymmetric engine thrust or component failures. To compensate for these asymmetries, some aircraft include heading control systems which can control the nosewheel angle without input from the flight crew.

An aircraft condition changes with time due to the impact of operating the aircraft. Examples include component wear or degradation. In particular, between maintenance intervals, the rate of component wear may increase unpredictably, for example due to varying operational and/or environmental conditions. Where a Heading Control Function (HCF) is used, the angular range within which the automated steering control is allowed to move the steering may be limited, in order to avoid masking such changes in aircraft condition. However, this limits the range over which such a HCF is effective.

The present invention mitigates the above-mentioned problems and accordingly may provide an improved monitoring system for an aircraft.

SUMMARY

A first aspect of the present invention provides a monitoring system for an aircraft, the monitoring system comprising: a controller that is configured to: determine, based on one or more conditions, one or more expected operating characteristics of a steering system of the aircraft, the one or more expected operating characteristics being expected operating characteristics for controlling the aircraft on a surface to maintain the aircraft on a desired path along the surface, the one or more conditions comprising one or more aircraft conditions indicative of an internal condition of the aircraft and/or one or more external conditions indicative of an external influence on the aircraft; perform a comparison process to compare the expected one or more operating characteristics with one or more actual operating characteristics of the steering system under which the steering system is operated when controlling the steering of the aircraft on the surface to maintain the aircraft on the desired path along the surface; and determine, based on the comparison process, whether to issue a signal indicating a condition of the aircraft.

Optionally, the controller is configured to perform the comparison process to compare the expected one or more operating characteristics with respective one or more actual operating characteristics of the steering system under which the steering system is operated when controlling the steering of the aircraft on the surface to maintain the aircraft on the desired path along the surface.

Optionally, the condition of the aircraft is indicative of an abnormal state of the steering system. Optionally, the condition of the aircraft is indicative of an abnormal state of a part of the steering system, such as a nose landing gear or a vertical stabilizer.

Optionally, the expected one or more operating characteristics comprises a range and/or a threshold. Optionally, the threshold comprises a maximum value and/or a minimum value.

Optionally, the one or more expected operating characteristics comprises an angular range of a nose wheel angle of the aircraft and/or an amount of rudder trim. Optionally, the amount of rudder trim is indicative of a magnitude of deviation from a longitudinal axis of the aircraft. Optionally, the comparison process comprises an identification process to identify whether the respective one or more actual operating characteristics exceeds the range and/or the threshold.

Optionally, the signal comprises an audio-visual output. Optionally, the signal comprises a haptic output. Optionally, the haptic output is provided by a tiller, a steering wheel, and/or other steering mechanism provided in a cockpit of the aircraft.

Optionally, the signal comprises information indicative of reducing a ground speed of the aircraft. Optionally, the signal comprises information indicative of reducing a ground speed of the aircraft by adjusting a thrust and/or brake demand.

Optionally, the controller is configured to determine, based on the comparison process, whether to issue the signal indicating a condition of the aircraft and transmit information about the comparison process to a recorder. Optionally, the recorder is on board the aircraft. Optionally, the recorder is provided remotely from the aircraft. Optionally, the controller is configured to determine, based on the comparison process, whether to issue the signal indicating the condition of the aircraft and wirelessly transmit information about the comparison process to the recorder.

Optionally, the controller is configured to issue the signal indicating a condition of the aircraft. Optionally, the controller is configured to transmit the information about the comparison process to the recorder.

Optionally, the one or more external conditions comprises an indication of a wind direction generated by a wind direction sensor arranged to determine a wind direction with respect to a longitudinal axis of the aircraft. Optionally, the one or more external conditions comprises an indication of a wind speed generated by a wind speed sensor arranged to determine a wind speed with respect to the aircraft. Optionally, the one or more external conditions comprises an amount of runway camber as indicated by a runway camber sensor.

Optionally, the one or more aircraft conditions comprises an indication of a weight and/or a center of gravity of the aircraft. Optionally, the one or more aircraft conditions comprises an amount of roll of the aircraft as indicated by a gyro sensor. Optionally, the one or more aircraft conditions comprises an indication of a port side tyre pressure and a starboard side tyre pressure. Optionally, the one or more aircraft conditions comprises an indication of a characteristic of a suspension element of a landing gear, such as a shock absorber.

Optionally, the one or more aircraft conditions comprises an indication of an amount of thrust from a starboard engine of the aircraft and an amount of thrust from a port engine of the aircraft.

Optionally, the one or more aircraft conditions comprises an indication of an amount of braking from a starboard brake of the aircraft and an amount of braking from a port brake of the aircraft. Optionally, the indication of the amount of braking from the starboard brake of the aircraft is a total amount of braking. Optionally, the indication of the amount of braking from the port brake of the aircraft is a total amount of braking.

A second aspect of the present invention provides an avionics system comprising the monitoring system according to the first aspect.

Optionally, the avionics system comprises a heading control system for controlling the aircraft on the desired path by controlling the actual one or more operating characteristics of the steering system of the aircraft. Optionally, the heading control system comprises a control process to control a nose wheel angle of the steering system within an angular range based on the one or more conditions. Optionally, the signal indicating a condition of the aircraft is a signal to disable control of the aircraft by the heading control system.

A third aspect of the present invention provides an aircraft comprising the monitoring system according to the first aspect or the avionics system according to the second aspect.

A fourth aspect of the present invention provides a method of monitoring an aircraft, the method comprising: determining, based on one or more conditions, one or more expected operating characteristics of a steering system of the aircraft, the one or more expected operating characteristics being expected operating characteristics for controlling the aircraft on a surface to maintain the aircraft on a desired path along the surface, the one or more conditions comprising one or more aircraft conditions indicative of an internal condition of the aircraft and/or one or more external conditions indicative of an external influence on the aircraft; performing a comparison process to compare the expected one or more operating characteristics with one or more actual operating characteristics of the steering system under which the steering system is operated when controlling the steering of the aircraft on the surface to maintain the aircraft on the desired path along the surface; and determining, based on the comparison process, whether to issue a signal indicating a condition of the aircraft.

A fifth aspect of the present invention provides a non-transitory computer readable storage medium comprising a set of computer-readable instructions stored thereon, which, when executed by a controller of a monitoring system, cause the controller to: to operate the method according to the fourth aspect.

A sixth aspect of the present invention provides an aircraft assistance device for assisting operation of an aircraft, the aircraft assistance device comprising: one or more processors configured to: obtain at least one predicted steering command according to a detection of at least one aircraft operation parameter and/or at least one environmental parameter; and cause an action to be generated based on a comparison of the at least one predicted steering command with at least one current steering command, wherein the action is for assisting operation of the aircraft.

The above aspects of the present invention provide for improved monitoring of an aircraft. The ability to detect an abnormal condition of the aircraft is increased by the above aspects of the present invention.

Any optional feature(s) of any one aspect of the present invention may be equally applied to any other aspect(s) of the present invention, where appropriate.

BRIEF DESCRIPTION OF THE DRAWINGS

Embodiments of the invention will now be described, by way of example only, with reference to the accompanying drawings, in which.

DETAILED DESCRIPTION

Figure 1:
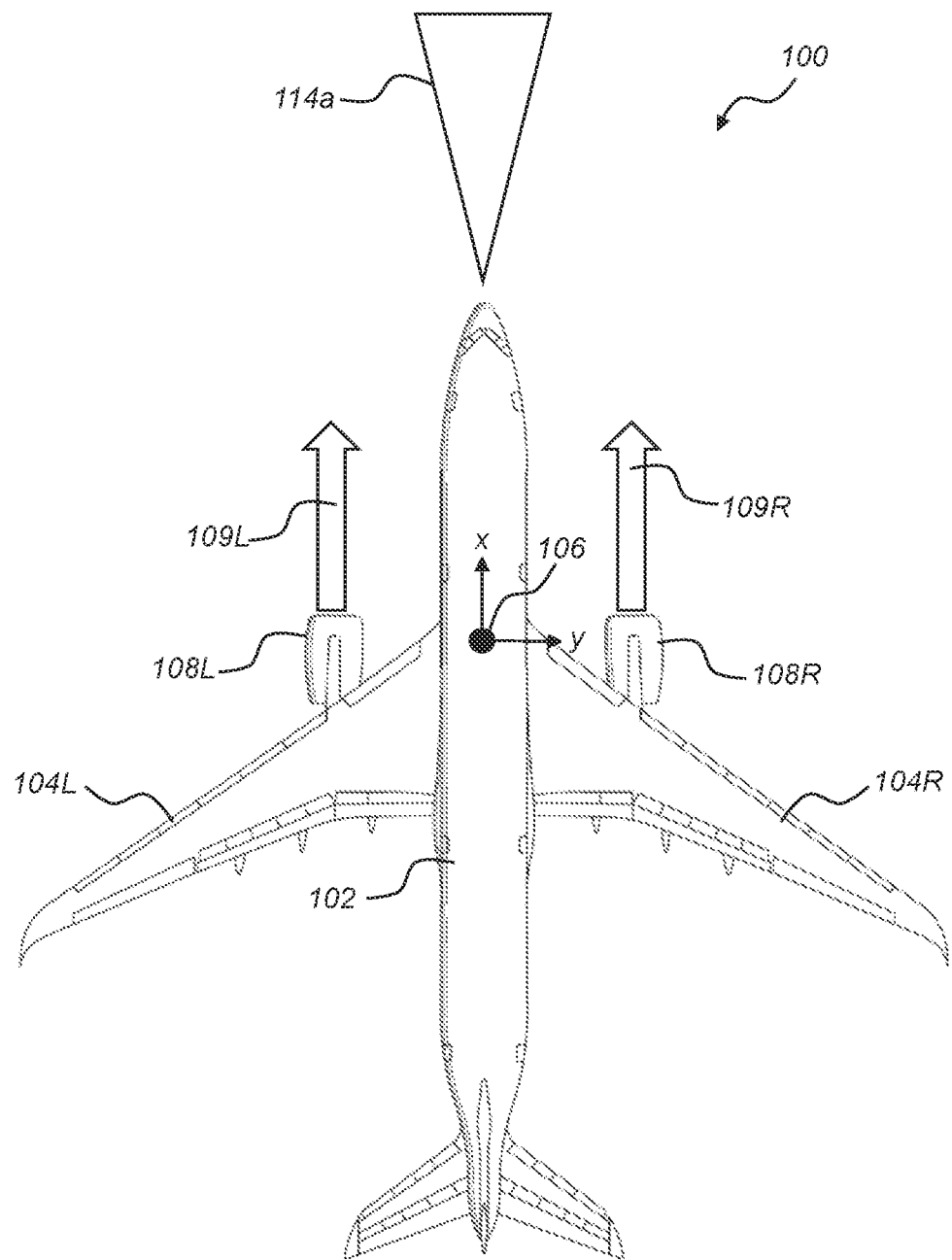
FIG. 1 is a schematic diagram showing a plan view of an aircraft according to an embodiment.

FIG. 1 is a plan view of an aircraft 100 having a fuselage 102 and wings including a left wing 104L and a right wing 104R extending outwardly from the fuselage. The aircraft is aligned with a set of axes including a longitudinal axis denoted by an arrow labelled x, which is parallel to the direction of the aircraft in straight and level flight and a lateral axis denoted by an arrow labelled y in a direction perpendicular to the longitudinal axis. The aircraft has a center of gravity 106.

During ground operations, the aircraft 100 might, in some circumstances be propelled forward by its engines, which in the example shown in FIG. 1, include a left engine 108L and a right engine 108R. In other examples, the aircraft might include more than one left and right engines. The left engine might be mounted on or under the left wing 104L and the right engine might be mounted on or under the left wing 104R.

When both engines 108L, 108R are providing the same amount of thrust, indicated by thrust vectors 109L, 109R shown as arrows in FIG. 1, the engines do not provide a yawing moment about the center of gravity 106.

Figure 2:
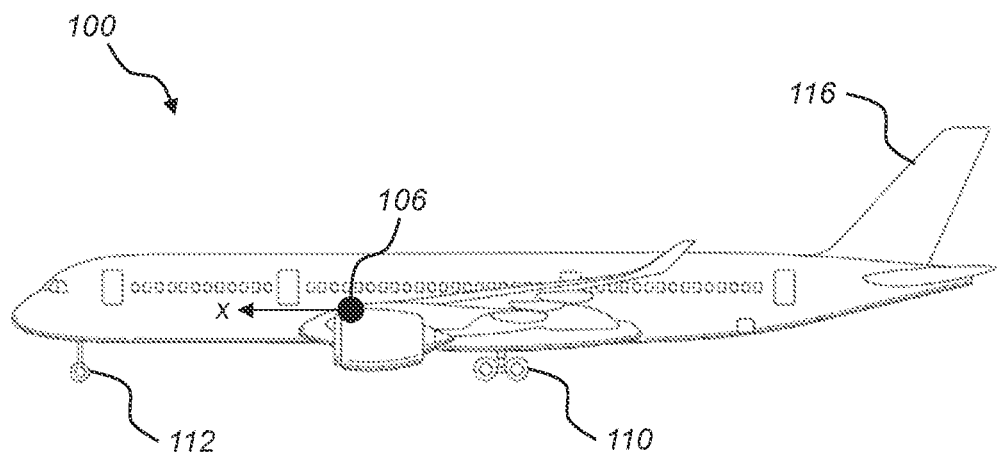
FIG. 2 is a schematic diagram showing a side view of an aircraft according to an embodiment.

FIG. 2 is a side view of an aircraft, such as the aircraft 100 shown in FIG. 1. The aircraft has landing gear which supports the aircraft when it is on the ground and controls the movement of the aircraft during ground manoeuvres such as landing, taxiing and take off. The landing gear comprises a main landing gear (referred to hereinafter as the MLG 110) and a nose landing gear (referred to hereinafter as the NLG 112). During ground manoeuvres, at speeds at which a vertical stabilizer 116 of the aircraft, comprising a rudder, may not produce enough of an aerodynamic effect to steer the aircraft, the NLG is steerable to steer the aircraft. To steer the aircraft, the NLG is moved by an angle with respect to the longitudinal axis x of the aircraft to steer the aircraft. Such movements of the NLG can be manually steered under control of the flight crew (for example, the pilot) using a tiller, steering wheel, or other steering mechanism provided in the cockpit of the aircraft.

In the absence of other yawing moments, when both the left and right engines 108L, 108R are providing equal thrust, the thrust provided by the left and right engines is applied equally about the center of gravity 106 and the aircraft 100 will advance along the longitudinal axis x of the aircraft. During ground manoeuvres, the aircraft will experience forces that, without correction, may cause the heading of the aircraft to deviate from the longitudinal axis. For example, influences such as crosswinds, cambers on the taxiways and runway, asymmetry in tyre pressures or tyre radii of different tyres of the MLG 110, or braking effects in different wheels of the MLG, for example, may result in the heading of the aircraft deviating even while the thrust provided by each of the left and right engines is equal, and without any input from the flight crew.

To reduce the workload of the flight crew in correcting these deviations, some aircraft are equipped with a control system, referred to herein as a heading control system, that can adjust the angle of the NLG 112 and/or the vertical stabiliser 116 without manual input from the flight crew. The degree to which such heading control systems can adjust the angle of the NLG and/or the vertical stabiliser is referred to hereinafter as an "authority". For example, limits may be determined to help prevent the aircraft overcompensating from deviations from an intended heading (for example, veering to one side or the other) that may, in some circumstances, cause the aircraft 100 to manoeuvre away from paved areas of an airfield, and/or provide an uncomfortable feeling to passengers in the cabin of the aircraft. The authority may define a range of angles within which the NLG can be controlled to provide a range of steering angles 114a, as shown in FIG. 1. In some examples, the authority refers to a value of the NLG or vertical stabiliser, such as an absolute position or angle, or relative position or angle.

In prior art examples, the authority may restrict functionality of aircraft by limiting the heading control system to a fixed and narrow degree, to ensure that unsafe adjustments are not made and/or that unsafe states cannot be masked. In contrast, in embodiments of the present invention, the aircraft is placed in context by observing its individual character and those of its surroundings, meaning limits to the heading control system can be widened to increase functionality of the aircraft, by biasing a range of control towards one side of the aircraft, for example. Extending limits of the heading control system (or manual control of steering) by taking context into account provides an aircraft with improved functionality.

Figure 3:
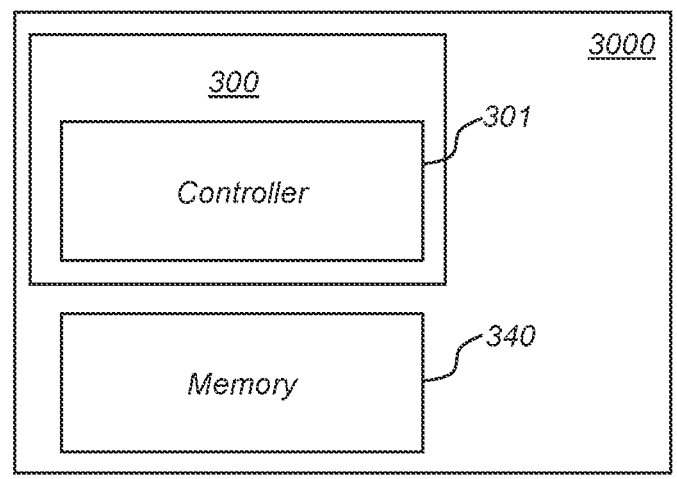
FIG. 3 is a schematic diagram showing an avionics system according to an embodiment.

FIG. 3 illustrates an avionics system 3000 according to an embodiment. The avionics system comprises a monitoring system 300 and a memory 340. In other embodiments, the memory may be omitted from the avionics system, for example when the memory is located off an aircraft comprising the avionics system.

The monitoring system 300 is for monitoring an aircraft, such as the aircraft 100 described in relation to the embodiment of FIG. 1, to prevent a potentially unsafe state being masked to the flight crew by operation of the aircraft, for example when using the heading control system, or when manually overcompensating a steering of the aircraft. The monitoring system is an aircraft assistance device for assisting operation of the aircraft. The monitoring system comprises a controller 301. In some embodiments, the controller is a processor or one more processors.

The controller 301 is configured to obtain at least one predicted steering command for influencing steering of the aircraft 100. The at least one predicted steering command is obtained according to a detection of at least one aircraft operation parameter and/or at least one environmental parameter. The controller is configured to cause an action to be generated for assisting operation of the aircraft. The action is caused to be generated based on a comparison, of the at least one predicted steering command with at least one current steering command. An example of the comparison is a proximity of the at least one predicted steering command with respect to the at least one current steering command. The action is for assisting operation of the aircraft. That is, the action comprises a signal indicating a condition of the aircraft. Advantageously, the likelihood of reliably detecting an abnormal (for example, unsafe or atypical) condition of the aircraft is increased.

Figure 4:
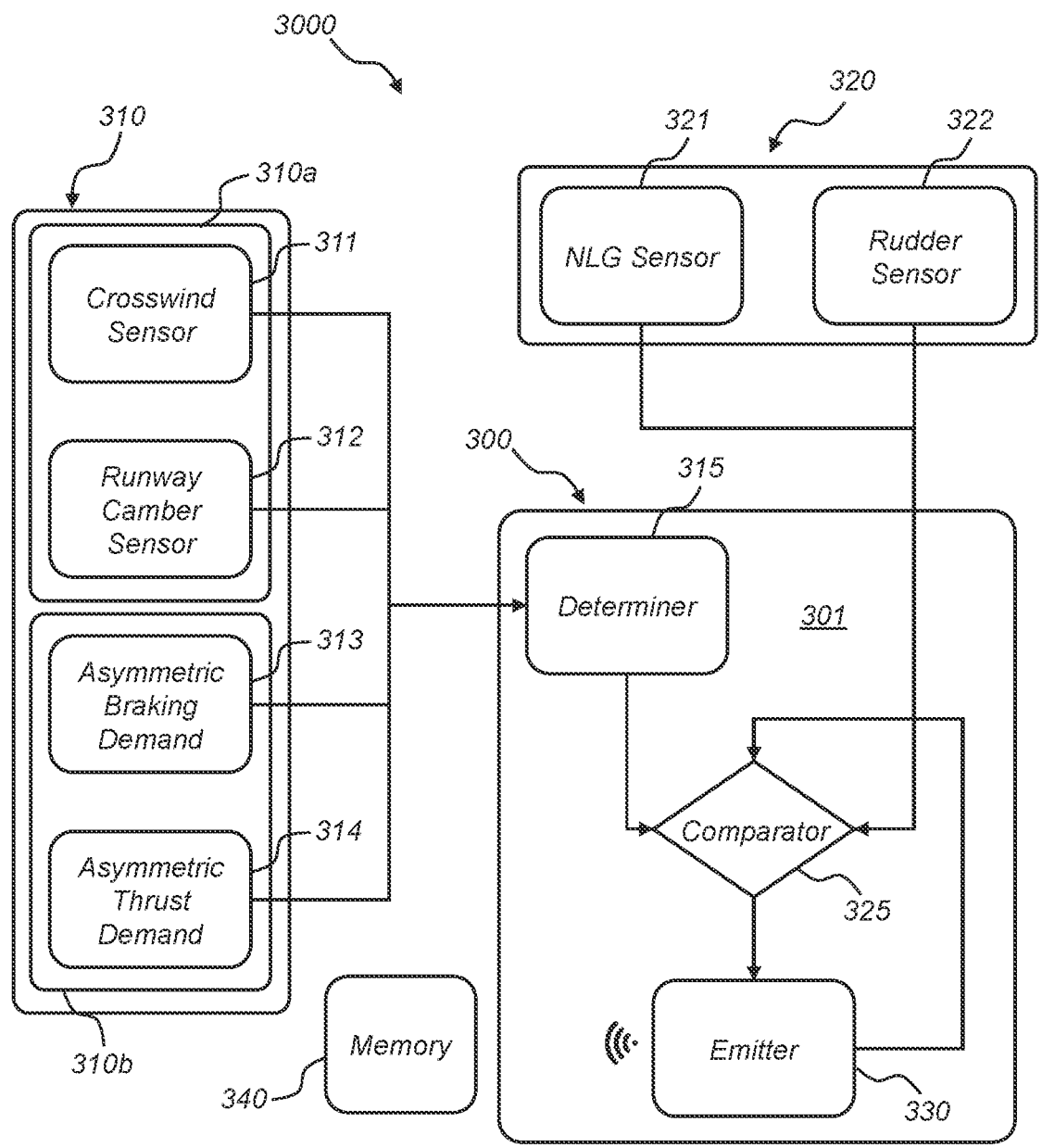
FIG. 4 is a schematic diagram showing detail of the avionics system of FIG. 3.

A detailed example of the avionics system 3000 is shown in FIG. 4. The controller 301 comprises a determiner 315, a comparator 325 and an emitter 330. The determiner is configured to determine an expected authority of a steering system of the aircraft 100 based on one or more conditions 310. In this embodiment, the expected authority, as determined by the determiner 315, is referred to as a "dynamic" authority, in contrast to the prior art "fixed" authority described above. That is, the dynamic authority is variable based on one or more conditions 310 that are received by the determiner. In contrast to the fixed authority of the heading control system, or an observed authority described below, the dynamic authority is representative of one or more expected operating characteristics of the steering system of the aircraft 100 based on the one or more conditions 310. The one or more expected operating characteristics of the steering system of the aircraft are therefore adjusted depending on a context of the aircraft. Use of the dynamic authority may widen a degree of steering of the aircraft that can be applied, for example, by a heading control system as described below, by taking account of operational factors, such as aircraft factors (for example, aircraft conditions indicative of an internal condition of the aircraft) and environment factors (for example, external conditions indicative of an external influence on the aircraft).

In this embodiment, the one or more expected operating characteristics of the steering system comprises an angular range of a nose wheel angle of the NLG 112 and/or an amount of rudder trim of the vertical stabiliser 116. In some embodiments, the dynamic authority is determined by the determiner using a database. In such examples, the determiner is configured to obtain a range and/or threshold from the database using the one or more conditions that are received by the determiner. The comparator 325 is configured to perform a comparison process to compare signals from sensors 320, representing one or more actual operating characteristics of the steering system, with the dynamic authority, as determined by the determiner 315. The signals from the sensors 320 may be referred to as the observed authority. The observed authority may also be referred to as an "applied" authority. The observed authority is representative of one or more actual operating characteristics of the steering system of the aircraft 100 and may be indicative of manual inputs from the flight crew. In situations whereby the observed authority exceeds the dynamic authority, the aircraft may be operating abnormally, for example due to increased wear or degradation of a component of the steering system. Detection of an abnormal state of the steering system is possible by the comparison process and flight crew can be alerted accordingly.

Responsive to the detection of the abnormal state of the steering system, the emitter 330 can issue a command to adjust a control parameter of the aircraft 100. Additionally, or alternatively, an audio-visual output, such as a warning light or an alarm, may be provided to flight crew, ground crew, and/or a remote monitoring center based on a signal indicating a condition of the aircraft. In some embodiments, haptic feedback may be provided to the flight crew, for example by vibration of a component of the steering system, such as a tiller, a steering wheel, and/or other steering mechanism provided in a cockpit of the aircraft. Additionally, or alternatively, the emitter may issue a signal comprising a command to adjust a control parameter of the aircraft. The control parameter may relate to a parameter of the steering, brake, engine, and/or suspension system. For example, the control parameter may comprise disabling automated steering by the heading control system. Other examples include an adjustment of an asymmetric braking demand, an asymmetric engine thrust demand, and/or an amount of rudder trim of the vertical stabiliser 116. The adjustment may be dependent on a ground speed of the aircraft. Issuance of the command may be recorded to the memory 340. In an embodiment, the determiner 315 is configured to determine whether to transmit information about the comparison process to a recorder. In the embodiment shown in FIG. 4, the emitter 330 wirelessly transmits information about the comparison process to the memory 340.

In this embodiment, the dynamic authority relates to an expected range of angles within which the aircraft steering is expected to be operated in order to maintain the aircraft on a desired path (for example, a straight line), taking into account internal and/or external conditions under which the aircraft is operating. The observed authority relates to an actual angle or range of angles at which the aircraft is operated. For example, the dynamic authority may comprise an expected angular range a nose wheel angle of the NLG 112, and the observed authority may represent an actual angle applied to the NLG. In some examples, an amount of rudder trim of the vertical stabiliser 116 may also be taken into account in determining the observed authority; for example, an angular contribution from the steering applied to the NLG may be summed with an angular contribution from the rudder trim of the vertical stabiliser. The angular range of the nose wheel angle of the NLG and the amount of rudder trim of the vertical stabiliser are examples of operating characteristics of the steering system of the aircraft for controlling the aircraft on a surface to maintain the aircraft on a desired path (for example, in a straight line) along the surface (wherein the path is sometimes referred to as a heading). In yet other embodiments, one or each authority may be formed from characteristics in addition to the angular range of a nose wheel angle of the NLG and the amount of rudder trim of the vertical stabiliser.

In this embodiment, the controller 301 is configured to receive signals from sensors 320 relating to the NLG 112 and/or the rudder of the vertical stabiliser 116. The nose wheel angle of the NLG is detected by an NLG sensor 321, and the amount of rudder trim of the vertical stabiliser is detected by a rudder sensor 322. In this embodiment, if it is determined that the contribution from the angle of the NLG and/or the amount of rudder trim of the vertical stabiliser exceeds the dynamic authority, then the emitter 330 of the controller issues the signal indicating a condition of the aircraft 100. The signal from the emitter may be issued to and recorded by the memory 340 of the avionics system 300. In this embodiment, the memory is on board the aircraft. In some embodiments, the memory may be provided remotely from the aircraft. In this embodiment, the signal comprises an audio-visual output. Issuance of the audio-visual output may be recorded to the memory 340. In some embodiments, the signal comprises a time, duration, and/or an amount by which the authority is exceeded.

In some embodiments, steering of the aircraft 100 is automatically controlled by a heading control system. The heading control system may provide automated control of the position of the NLG 112. That is the heading control system is an automated steering system of the aircraft that can provided automated control of the NLG to steer the aircraft. In other embodiments, the steering of the aircraft is manually controlled by the flight crew.

In some contexts, based on one or more conditions 310, the dynamic authority can be centered on the longitudinal axis x of the aircraft 100 and is substantially equal from port to starboard (left to right); this may be the case if the aircraft is experiencing a port side cross wind and starboard side asymmetric thrust demand that effectively cancel one another out, for example. The dynamic authority may be effectively enlarged compared to the fixed authority to an equal extent with respect to the port and starboard sides. The dynamic authority may comprise a predetermined angular range and/or a predetermined amount of rudder trim of the vertical stabiliser 116. The predetermined angular range may be stored, for example, in memory 340. An example angular range of the NLG 112 provided by the authority is ±6 degrees.

The dynamic authority is determined by the determiner 315 by the one or more conditions 310 that are detected. Signals inputted to the determiner about the one or more conditions may indicate that the aircraft 100 is biased to one side or another, and corrective action may be required to maintain a heading of the aircraft in response. The dynamic authority may be determined based on any information that the determiner can use to determine an asymmetry in the forces applied to the aircraft. Asymmetric forces may occur when the aircraft 100 is being operated in a so-called "one-engine-on" mode in which a dual engine aircraft's thrust is provided by only one of the aircraft's engines. In one example, an asymmetric thrust demand 314 may be indicated based on the statuses of engine oil pressure switches of the respective port and starboard engines 108L, 108R of the aircraft 100. For example, if one engine pressure switch (for example that of the port engine 108L) indicates that the left engine is on and the other engine pressure switch indicates that the other engine (for example, the starboard engine 108R) is off, then the asymmetric thrust demand may indicate an offset between the port and starboard (left and right). An amount of asymmetric thrust of the aircraft, as indicated by the asymmetric thrust demand, is an example of an aircraft condition 310b indicative of an internal condition of the aircraft.

In other examples, the asymmetric thrust demand 314 may be based on relative settings applied to the port and starboard engines 108L, 108R of the aircraft 100. For example, the asymmetric thrust demand may be based on one or more of: throttle settings of the respective engines, temperature measurements from at least one portion of the respective engines, pressure measurements from at least one portion of the respective engines (such as an oil pressure), or a fan speed of the respective engines.

Figure 5:
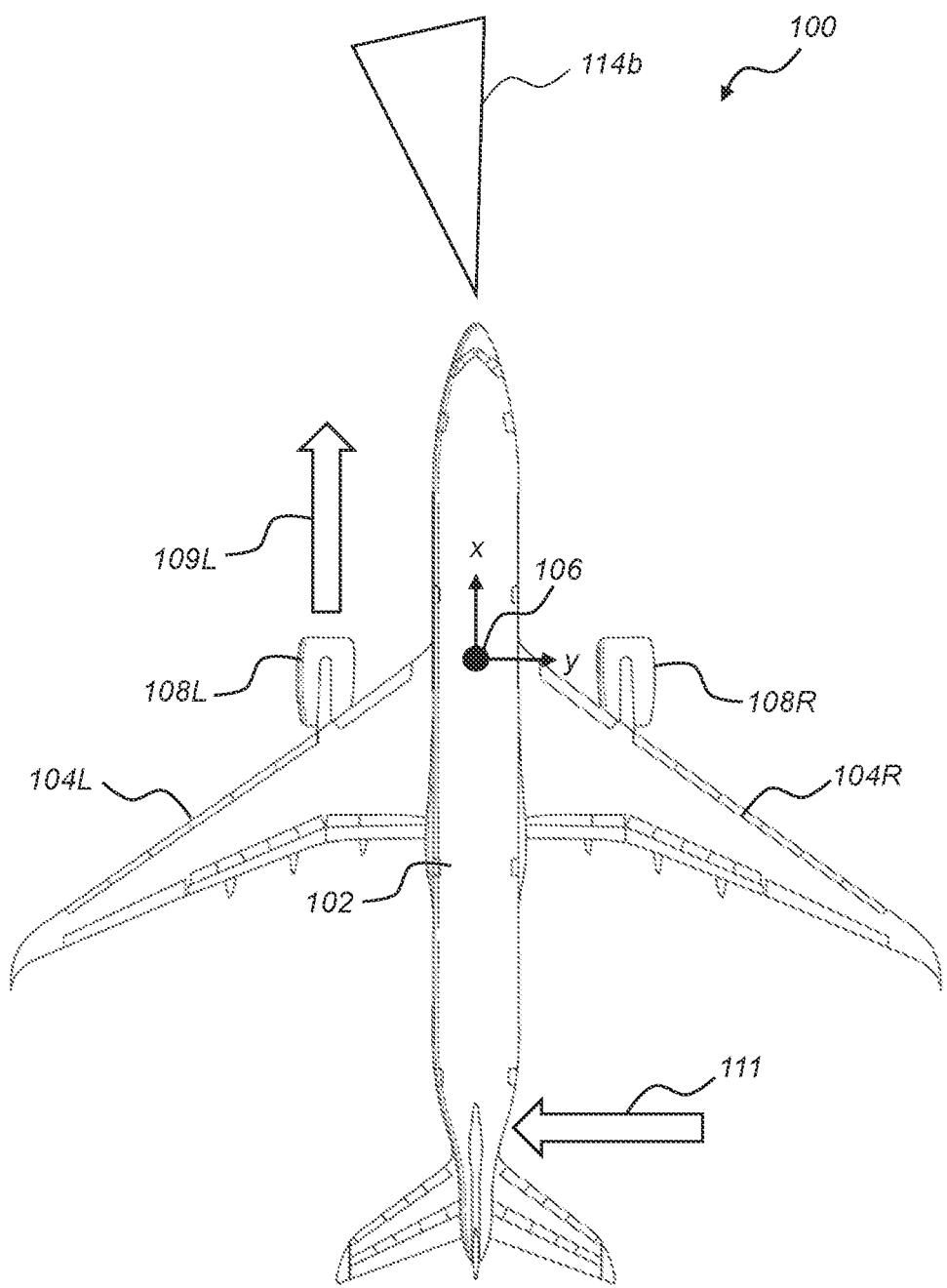
FIG. 5 is a schematic diagram showing a plan view of an aircraft according to an embodiment.

The dynamic authority, as determined by the determiner 315, may additionally or alternatively be generated based on inputs not relating to inputs from the flight crew but instead from external influences such as crosswinds such as that shown by the arrow 111 in FIG. 5. In this embodiment, a crosswind is detected by a crosswind sensor 311. The crosswind sensor, which may be referred to as a wind direction sensor, is used to determine a wind direction with respect to the longitudinal axis x of the aircraft 100. The wind direction, as indicated by the crosswind sensor, is an example of an external condition indicative of an external influence on the aircraft. In some embodiments, the crosswind sensor, or another sensor, may detect a speed of the wind.

In one example, the dynamic authority is based on readings from one or more sensors of the aircraft. For example, the determiner 315 may receive a reading, such as a temperature or pressure reading, of each of the port engine 108L and the starboard engine 108R. The determiner may then determine the dynamic authority based on a relationship between the two readings.

In an embodiment, the one or more conditions 310 comprises a runway camber sensor 312 and an asymmetric braking demand 313. An amount of runway camber, as indicated by the runway camber sensor, is another example of an external condition indicative of an external influence on the aircraft 100. The amount of runway camber results in an amount of roll of the aircraft with respect to a vertical axis perpendicular to the longitudinal axis x and lateral axis y of the aircraft. In some embodiments, the amount of roll may be indicated by a gyro sensor. An amount of asymmetric braking of the aircraft, as indicated based on brake torque levels of respective port and starboard brakes of the aircraft, is another example of an aircraft condition 310b indicative of an internal condition of the aircraft. In some embodiments, the runway camber sensor comprises a camera to visually detect a gradient of the runway. In other embodiments, the runway camber may be replaced by a database comprising information about a gradient of the runway, on the basis of a detected location of the aircraft on the runway, the detection of the location being based on GPS measurement, for example. In other embodiments, the aircraft condition may comprise an indication of a weight or a center of gravity of the aircraft. In an embodiment, one or more aircraft conditions 310b comprises an indication of a port side tyre pressure and a starboard side tyre pressure. The port side tyre pressure is a tyre pressure of a tyre of a port side of the aircraft. The starboard side tyre pressure is a tyre pressure of a tyre of a starboard side of the aircraft. In some embodiment, a tyre pressure is determined by a tyre pressure sensor. In an embodiment, the one or more aircraft conditions comprises an indication of a characteristic of a suspension element, such as a shock absorber, of the MLG 110. The characteristic comprises an amount of compression, an amount of displacement, or a position, for example.

In an embodiment, a reference model of the aircraft 100 may be recorded in a storage and accessed by the determiner 315 to form the dynamic authority. The reference model may be altered, to form a revised reference model, based on knowledge from previous operations of the aircraft. The controller may therefore be configured to learn from previous operations of the aircraft and adjust the reference model based on learned behaviour. The reference model of the aircraft comprises one or more equations, and information about the one or more conditions 310 is used to solve the one or more equations. The dynamic authority may be determined by the determiner using the reference model, the one or more equations, and the information about the one or more conditions. The one or more equations may comprise a calculation of a moment of the aircraft, such as a yawing force due to a crosswind, for example.

In an embodiment, the determiner determines the dynamic authority in an extraction process, by use of lookup tables that are recorded in the storage. In some embodiments, the memory 340 comprises the storage. Each of the lookup tables may comprise associations between values or range of values of a respective internal or external condition and corresponding contributions to the dynamic authority. According to a reading from a crosswind sensor 311, a direction and/or a speed of a crosswind is used, by the determiner to extract, from a first lookup table, a first level of adjustment required to the authority to place the aircraft 100 in context with the crosswind. For example, a windspeed of 10 m/s, caused by the crosswind vector 111 shown in FIG. 5, as indicated by the crosswind sensor, results in the extraction from the first lookup table, by the extraction process, of an increase of 2 degrees in the port side of an angular range of the NLG 112 (equating to −2 degrees).

The determiner repeats the extraction process for the other conditions 310. That is, a reading from a runway camber sensor 312 indicating an amount of runway camber, is used by the determiner 315 to extract, from a lookup table, a second level of adjustment required to the authority to place the aircraft in context with the runway camber. For example, a camber angle of 5 degrees downwards towards the port side of the aircraft 100 results in a 1 degree increase in the starboard side of the angular range of the NLG 112 being extracted (equating to +1 degree), by the extraction process, from the second lookup table.

Further, an asymmetric braking demand 313 indicating an amount of asymmetric braking of the aircraft, is used by the determiner to extract, from a third lookup table, a third level of adjustment required to the authority to place the aircraft in context with the asymmetric braking. Finally, at least in this embodiment, an asymmetric thrust demand 314 indicating asymmetric thrust forces, is used by the determiner to extract, from a fourth lookup table, a fourth level of adjustment required to the authority to place the aircraft in context with the asymmetric thrust. As an example, the extraction process using the asymmetric braking demand and the asymmetric thrust demand may result in a further 3 degrees increase in the starboard side of the angular range of the NLG 112 (equating to +3 degrees).

Each of the first-to-fourth levels of adjustment are combined to provide an overall level of adjustment that is needed to form the dynamic authority. In this embodiment, the first-to-fourth levels of adjustment are combined by summation. In other embodiments, a plurality of levels of adjustment may be inputted into an equation representing the above-mentioned reference model, to provide a single overall level of adjustment. In the example provided above, the overall adjustment is 2 degrees increase in the starboard side of the angular range of the NLG 112, equating to +2 degrees). Therefore, if the fixed authority is ±6 degrees, the adjustment changes this to a bias towards the starboard side, so that the dynamic authority has a range −4 to +8, wherein the plus sign (+) represents the starboard side and the minus sign (−) represents the port side. That is, the range of the authority is shifted by 2 degrees from the port side of the aircraft to the starboard side of the aircraft. Advantageously, the authority is adjusted based on a context of the aircraft. Any indication that an angle of the NLG is less than 4 degrees (port side) and greater than 8 degrees (starboard side), that is required to keep the aircraft 100 on a heading, may highlight a condition of the aircraft that requires investigation. That is, exceeding the −4 to +8 degree range of the NLG may indicated that behaviour of the aircraft is atypical or abnormal. This means that the condition of the aircraft is unexpected, based on the context of the aircraft and environmental settings. Beneficially, the dynamically set authority enables a more accurate determination of the expected steering range, which in turn enables a more accurate detection of when the steering is behaving abnormally.

In an embodiment, the signal may be issued by the emitter 330 if an instantaneous angle of the NLG 112 exceeds a range of an authority produced without context of the one of more conditions, or if the instantaneous angles of the NLG exceed said range for a period of time. In some embodiments, an identification process, by the comparator 325, is used to identify whether an instantaneous angle of the NLG exceeds a range and/or a threshold defined by the dynamic authority. In other embodiments, the identification process is used to identify a time period of an angle of the NLG exceeds a range and/or a threshold defined by the dynamic authority.

In an embodiment, the monitoring system 300 operates continuously such that the determiner 315 continually determines the dynamic authority. In other embodiments, the monitoring system is activated in response a detection of the fixed authority being exceeded. The detection may comprise a switch, wherein when the authority is exceeded, the monitoring system is activated by the switch turning on. In other embodiments, the monitoring system may be activated when the authority is exceeded for a period of time.

FIG. 5 is a plan view of an aircraft 100, such as the aircraft of FIGS. 1 and 2, in a situation which may cause the dynamic authority to be used based on context of the aircraft. In the example shown in FIG. 5, only a left single thrust vector 109L is applied and/or a crosswind vector 111 is applied to the aircraft to produce a yawing motion about the center of gravity 106 of the aircraft. As a result, the aircraft experiences a yawing force about the center of gravity indicating to the determiner 315 a bias towards the right (starboard) of the aircraft about the center of gravity of the aircraft. The dynamic authority, as determined by the determiner, therefore comprises a different range of steering angles 114b, as shown in FIG. 5, compared to the range of steering angles 114a, as shown in FIG. 1. The range of steering angles is contextualised by placing emphasis on a context of the aircraft (by observing an individual character of the aircraft and a character of surroundings of the aircraft). This effectively enables limits to steering control to be widened by dynamically shifting a center of a range of control, for example, to increase functionality of the aircraft.

Figure 6:
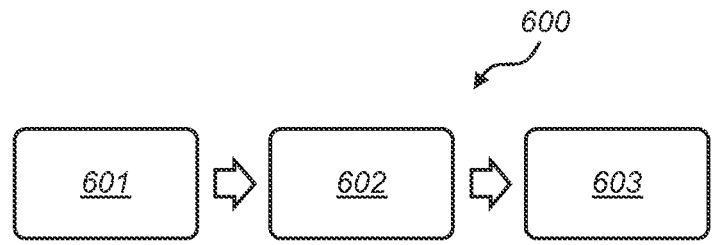
FIG. 6 is a flow diagram illustrating a method of monitoring an aircraft according to an embodiment.

FIG. 6 is a flow diagram illustrating a method 600 of monitoring an aircraft, such as the aircraft 100 described above with reference to FIG. 1.

At block 601, the method 600 comprises determining, based on one or more conditions, one or more expected operating characteristics of a steering system of the aircraft, the one or more expected operating characteristics being expected operating characteristics for controlling the aircraft on a surface to maintain the aircraft on a desired path along the surface, the one or more conditions comprising one or more aircraft conditions indicative of an internal condition of the aircraft and/or one or more external conditions indicative of an external influence on the aircraft.

At block 602, the method 600 comprises performing a comparison process to compare the expected one or more operating characteristics with one or more actual operating characteristics of the steering system under which the steering system is operated when controlling the steering of the aircraft on the surface to maintain the aircraft on the desired path along the surface.

At block 603, method 600 comprises determining, based on the comparison process, whether to issue a signal indicating a condition of the aircraft.

Figure 7:
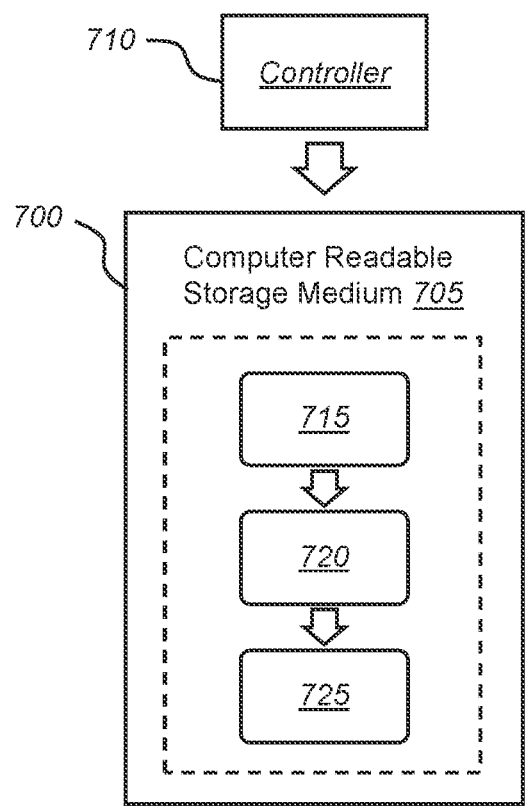
FIG. 7 is a schematic illustration of a set of computer readable instructions within a non-transitory computer-readable storage medium according to an embodiment.

A schematic illustration of a set of computer readable instructions 700 within a non-transitory computer-readable storage medium 705 according to an embodiment is shown in FIG. 7. The set of computer readable instructions are executed by a controller 710 of a monitoring system for an aircraft, for example the controller 301 of the monitoring system 300 described above. When executed, the instructions cause the controller to determine 715, based on one or more conditions, one or more expected operating characteristics of a steering system of the aircraft, the one or more expected operating characteristics being expected operating characteristics for controlling the aircraft on a surface to maintain the aircraft on a desired path along the surface, the one or more conditions comprising one or more aircraft conditions indicative of an internal condition of the aircraft and/or one or more external conditions indicative of an external influence on the aircraft.

The instructions further cause the controller to perform 720 a comparison process to compare the expected one or more operating characteristics with one or more actual operating characteristics of the steering system under which the steering system is operated when controlling the steering of the aircraft on the surface to maintain the aircraft on the desired path along the surface. The instructions further cause the controller to determine 725, based on the comparison process, whether to issue a signal indicating a condition of the aircraft.

In some embodiments, the monitoring system 300 described above with reference to FIG. 3 may be installed in an aircraft, such as the aircraft 100 described above with reference to FIGS. 1 and 2.

Advantageously, features of the embodiments described herein provide improved monitoring of an aircraft. In cases of increased component wear, an aircraft steering system may be different than normal during ground manoeuvres, such as maintaining a heading of the aircraft. In some instances, an abnormal adjustment of the aircraft steering system may go undetected, possibly because the abnormal adjustment is subtle, is made by the heading control system, rather than the pilot, and/or is compensated for by environmental factors, such as a crosswind. Consequently, increased component wear, which may contribute to the abnormal adjustment, may go undetected, until at least the next maintenance interval. Restricting a level of authority of the steering system can restrict operability of the aircraft. Conversely, increasing the level of authority, by allowing a wide degree of change, can mask an abnormal aircraft condition. Allowing a center of a range of control, for example, to shift to the port or starboard side of the aircraft helps to widen a span within with the range can move. The variation in steering control, by movement of the center of the range, for example, enables abnormal conditions of the aircraft to be detected when inputs stray beyond the limits of the range, for example. Advantageously, a range of control of an authority can be enlarged, based on one or more external conditions and/or or one or more aircraft conditions. This enables a greater degree of control when context allows because current environmental and operational behaviour is taken into account. Beneficially, this provides an authority that is based on a current scenario rather than a more extreme scenario. The embodiments described herein increase operability based on context without masking abnormal conditions of the aircraft. Advantageously, the likelihood of reliably detecting an abnormal condition of the aircraft is increased by the embodiments described herein. Advantageously, an authority is provided that is dynamic and varied depending on a context of the aircraft. This enables abnormal conditions of the steering system to be detected and a maintenance event to be brought forward for inspecting a component, as required. That is, the authority can be effectively increased when taking context of the aircraft and environment into account.

It is to be noted that the term "or" as used herein is to be interpreted to mean "and/or", unless expressly stated otherwise.

The above embodiments are to be understood as non-limiting illustrative examples of how the present invention, and aspects of the present invention, may be implemented. Further examples of the present invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the present invention, which is defined in the accompanying claims.

The invention claimed is:

1. A system for an aircraft comprising at least one controller configured to:
    based on one or more conditions, determine one or more expected operating characteristics of a steering system of the aircraft, the one or more expected operating characteristics being expected operating characteristics for controlling the aircraft on a surface to maintain the aircraft on a desired path along the surface, the one or more conditions comprising one or more aircraft conditions indicative of an internal condition of the aircraft and/or one or more external conditions indicative of an external influence on the aircraft;
    automatically steer the aircraft using a steering system of the aircraft on the desired path;
    determine that the aircraft is on the desired path;
    in response to determining that the aircraft is on the desired path and while the aircraft is on the desired path, determine one or more actual operating characteristics under which the steering system is being operated to control the steering of the aircraft on the desired path;
    perform a comparison process to compare the one or more expected operating characteristics with the one or more actual operating characteristics while the aircraft is on the desired path, wherein the comparison process includes a determination of whether an allowable range or threshold corresponding to the one or more actual operating characteristics is exceeded; and
    determine, based on the comparison process and the determination of whether the one or more actual operating characteristics exceed the allowable range or threshold, whether to issue a signal indicating a condition of the aircraft relevant to the steering of the aircraft.

2. The system according to claim 1, wherein the condition of the aircraft is indicative of an abnormal state of the steering system.

3. The system according to claim 1, wherein the allowable range is an allowable range in which a nose gear wheel may be turned.

4. The system according to claim 1, wherein the threshold is an amount of rudder trim.

5. The system according to claim 1, wherein the signal comprises an audio-visual output.

6. The system according to claim 1, wherein the controller is configured to determine, based on the comparison process, whether to issue the signal indicating a condition of the aircraft and transmit information about the comparison process to a recorder.

7. The system according to claim 1, wherein the signal comprises a command to adjust a control parameter of the aircraft.

8. The system according to claim 1, wherein the one or more external conditions comprises an indication of a wind speed generated by a wind speed sensor and/or a wind direction generated by a wind direction sensor arranged to determine a wind direction with respect to a longitudinal axis of the aircraft.

9. The system according to claim 1, wherein the one or more aircraft conditions comprises an indication of a weight and/or a center of gravity of the aircraft.

10. The system according to claim 1, the one or more aircraft conditions comprises an indication of an amount of thrust from a starboard engine of the aircraft and an amount of thrust from a port engine of the aircraft.

11. The system according to claim 1, wherein the one or more aircraft conditions comprises an indication of an amount of braking from a starboard brake of the aircraft and an amount of braking from a port brake of the aircraft.

12. An avionics system comprising the system according to claim 1.

13. An aircraft comprising the system according to claim 1.

14. A method comprising:
    determining, based on one or more conditions, one or more expected operating characteristics of a steering system of the aircraft, the one or more expected operating characteristics being expected operating characteristics for controlling the aircraft on a surface to maintain the aircraft on a desired path along the surface, the one or more conditions comprising one or more aircraft conditions indicative of an internal condition of the aircraft and/or one or more external conditions indicative of an external influence on the aircraft;
    automatically steer the aircraft using a steering system of the aircraft on the desired path;
    determine that the aircraft is on the desired path;
    in response to determining that the aircraft is on the desired path and while the aircraft is on the desired path, determine one or more actual operating characteristics under which the steering system is being operated to control the steering of the aircraft on the desired path;
    comparing the one or more expected operating characteristics with the one or more actual operating characteristics while the aircraft on the desired path along the surface;
    determining, based on the comparison, whether a range or threshold corresponding to the one or more actual operating characteristics is exceeded; and
    determining, based on the determination of whether the range or the threshold is exceeded, whether to issue a signal indicating a condition of the aircraft relevant to the steering of the aircraft.

15. An aircraft assistance device for assisting operation of an aircraft, the aircraft assistance device comprising one or more processors configured to:
- obtain at least one predicted steering command according to a detection of at least one aircraft operation parameter and/or at least one environmental parameter;
- automatically steer the aircraft using a steering system of the aircraft on a desired path along a surface;
- determine that the aircraft is on the desired path; and
- in response to the determination that the aircraft is on the desired path and while the aircraft is on the desired path, cause an action to be generated based on a comparison of the at least one predicted steering command with at least one current steering command and determine whether a range or threshold corresponding to the one or more actual operating characteristics is exceeded;
- wherein the action is for assisting operation of the aircraft.

16. The system of claim 2, wherein the signal is configured to cause an adjustment of a control parameter of the steering system.

17. The method of claim 14, wherein the determining step includes determining if the condition of the aircraft is an abnormal condition and the signal causes adjustment of a control parameter applied to the steering.

18. A steering system for an aircraft comprising at least one controller configured to:
- determine, based on one or more conditions, one or more expected operating characteristics of a steering system of the aircraft, the one or more expected operating characteristics being expected operating characteristics for controlling the aircraft on a surface to maintain the aircraft on a desired path along the surface, the one or more conditions comprising one or more aircraft conditions indicative of an internal condition of the aircraft and/or one or more external conditions indicative of an external influence on the aircraft;
- provide an automated steering function to steer the aircraft along a desired path on a surface;
- determine that the aircraft is on the desired path;
- in response to determining that the aircraft is on the desired path and while the aircraft is on the desired path, determine one or more actual operating characteristics under which the steering system is being operated to control the steering of the aircraft on the desired path;
- while the aircraft is on the desired path, perform a comparison process to compare the one or more expected operating characteristics with the one or more actual operating characteristics;
- determine, based on the comparison, whether an allowable range or threshold corresponding to the one or more actual operating characteristics is exceeded;
- determine, based on the determination of whether the allowable range or threshold is exceeded, a condition of the aircraft, and
- depending on the condition, automatically disabling the automated steering function of the steering system.

19. The system according to claim 4, further comprising, based on the comparison process, adjusting an allowable angular range of turning the nose wheel angle of the aircraft and/or the amount of rudder trim.

* * * * *